(No Model.)

J. BRINKERHOFF.
HARROW TOOTH.

No. 390,065. Patented Sept. 25, 1888.

Witnesses:
G. A. Tauberschmidt
L. B. Whitaker

Inventor:
Jacob Brinkerhoff
By his attys
Whitaker & Prevost

UNITED STATES PATENT OFFICE.

JACOB BRINKERHOFF, OF AUBURN, NEW YORK.

HARROW-TOOTH.

SPECIFICATION forming part of Letters Patent No. 390,065, dated September 25, 1888.

Application filed June 22, 1888. Serial No. 277,893. (No model.)

*To all whom it may concern:*

Be it known that I, JACOB BRINKERHOFF, a citizen of the United States, residing at Auburn, in the county of Cayuga and State of New York, have invented certain new and useful Improvements in Harrow-Teeth; and I do hereby declare the following to be a full, clear, and exact description of the invention, such as will enable others skilled in the art to which it appertains to make and use the same.

My invention relates to spring-teeth for harrows, and has for its object to provide such teeth with a front cutting-edge, whereby desirable results are accomplished, which will be hereinafter more fully explained.

In the use of spring-tooth harrows the movement of the elastic teeth through the soil is not regular or continuous. On the contrary, the teeth are in constant vibration, caused by their meeting with obstructions which impede their progress momentarily, and then being released and springing forward. When the flat spring-tooth now in general use with this class of harrows is employed, the flat earth-engaging portion of the tooth is easily held back by slight obstructions—such as clods or lumps of earth—and in springing forward when released from such obstructions it merely pushes them aside out of the path of the tooth. When the soil is somewhat moist, this form of tooth soon becomes clogged by the adhering particles of earth and renders the draft of the harrow very heavy. I provide a spring harrow-tooth having its earth-engaging portion V-shaped in cross-section, presenting a vertical or nearly vertical cutting-edge to the soil. By this means, when the point of the tooth springs ahead, after being released from an obstruction, the sharp edge will cut and pulverize the lumps of earth and clods with which it comes in contact. In case the soil is moist the forward movement of the tooth will efficiently clean the earth-engaging point of the tooth, and this feature, together with the peculiar form of the tooth, renders the draft of the harrow materially lighter.

I have illustrated my invention in the accompanying drawings, which form a part of this specification; and said invention is fully disclosed in the following description and claims.

Figure 1:
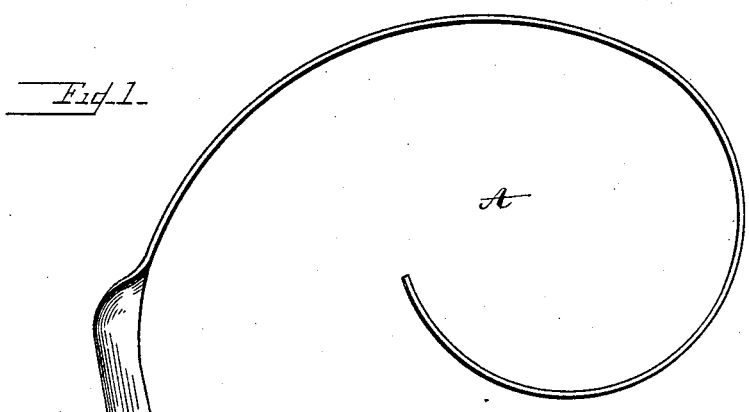
Figure 3:
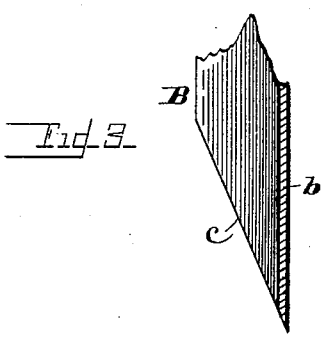
Figure 2:
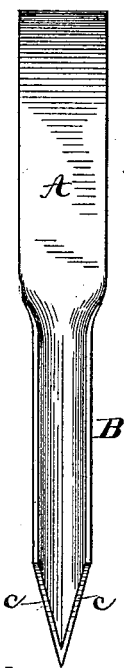

In the drawings, Figure 1 is a side elevation of a spring harrow-tooth embodying my invention. Fig. 2 is a rear elevation of the same. Fig. 3 is a partial vertical section of the earth-engaging portion of the tooth, and Fig. 4 is a transverse section of the same.

In the drawings, A represents the elastic body of the tooth, which is of the usual or preferred form of construction. B is the earth-engaging portion of the tooth, which is provided with the vertical cutting-edge $b$. I prefer to form this cutting-edge by bending the sides of the flat strip forming the tooth to the rear, as shown in Figs. 1 and 2, but it may be formed in any other desired way. At its lower extremity the tooth may be provided with the inclined edges $c$, which extend upwardly from the front of the tooth, forming a point for entering the soil, or the lower ends of the teeth may be cut in any other desired form. The V-shaped portion of the tooth preferably extends as far or a little farther than the tooth engages the earth. This form of tooth will offer much less resistance in passing through the earth than the flat harrow-tooth now in general use, and the draft of the harrow will thereby be rendered much lighter.

Figure 4:
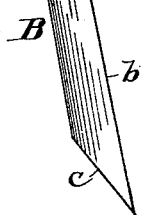

I may, if found desirable, provide the earth-engaging portion of the tooth with a thickened front portion to re-enforce the cutting-edge, as shown in dotted lines, Fig. 4. This thickened portion may be formed integrally with the tooth, or made separately and attached thereto in any desired manner. By this means the front or cutting edge of the tooth, which is subjected to the greatest wear, will be thicker than the side portions, which will add materially to the durability of the tooth. By forming the front edge as shown in dotted lines, Fig. 4, a sharper cutting-edge is formed, which will more readily pulverize lumps or clods of earth.

I am aware that it has been proposed to make rigid cultivator or harrow teeth of angular form with a central cutting-edge. This I do not claim.

I claim—

1. A harrow-tooth having an elastic body and having its earth-engaging portion provided with a central cutting-edge, substantially as described.

2. A harrow-tooth having an elastic body and having its earth-engaging portion provided with a central cutting-edge, the surface of the tooth at each side of the said edge forming parts of different planes intersecting at said edge, substantially as described.

3. A harrow-tooth having an elastic body and having each side of its earth-engaging portion bent backward, forming a central cutting-edge, substantially as described.

4. A harrow-tooth having an elastic body and a V-shaped earth-engaging portion, the apex forming a cutting-edge, the said cutting-edge being adapted to resist greater wear than the sides of the same, substantially as described.

In testimony whereof I affix my signature in presence of two witnesses.

JACOB BRINKERHOFF.

Witnesses:
A. W. EHLERS,
G. B. LONGSTREET.